United States Patent
White et al.

(10) Patent No.: US 8,043,448 B2
(45) Date of Patent: Oct. 25, 2011

(54) NON-HEAT TREATED ZIRCONIUM ALLOY FUEL CLADDING AND A METHOD OF MANUFACTURING THE SAME

(75) Inventors: David White, Wilmington, NC (US); Daniel R. Lutz, San Jose, CA (US); Yang-Pi Lin, Wilmington, NC (US); John Schardt, Wilmington, NC (US); Gerald Potts, Wilmington, NC (US); Robert Elkins, Wilmington, NC (US); Hiroaki Kagami, Kanagawa-Ken (JP); Hideyuki Mukai, Kanagawa-Ken (JP)

(73) Assignee: Global Nuclear Fuel-Americas, LLC, Wilmington, NC (US)

( * ) Notice: Subject to any disclaimer, the term of this patent is extended or adjusted under 35 U.S.C. 154(b) by 1691 days.

(21) Appl. No.: 10/935,156

(22) Filed: Sep. 8, 2004

(65) Prior Publication Data

US 2006/0048869 A1     Mar. 9, 2006

(51) Int. Cl.
*C22F 1/18*     (2006.01)
(52) U.S. Cl. .................. 148/672; 148/421; 376/277
(58) Field of Classification Search .............. 148/519, 148/672, 421; 376/277
See application file for complete search history.

(56) References Cited

U.S. PATENT DOCUMENTS

| | | | |
|---|---|---|---|
| 3,963,534 A | 6/1976 | Frenkel et al. |
| 4,360,389 A | 11/1982 | Urquhart |
| 4,440,862 A | 4/1984 | Cheng et al. |
| 4,450,016 A | 5/1984 | Vesterlund et al. |
| 4,450,020 A | 5/1984 | Vesterlund et al. |
| 4,512,819 A | 4/1985 | Steinberg |
| 4,573,629 A | 3/1986 | Imahashi et al. |
| 4,576,654 A | 3/1986 | Eddens et al. |
| 4,584,030 A | 4/1986 | McDonald et al. |
| 4,649,023 A | 3/1987 | Sabol et al. |
| 4,664,727 A | 5/1987 | Inagaki et al. |
| 4,678,521 A | 7/1987 | Yoshida et al. |
| 4,717,428 A | 1/1988 | Comstock et al. |
| 4,717,434 A | 1/1988 | McDonald et al. |
| 4,735,768 A | 4/1988 | Stehle et al. |
| 4,764,223 A | 8/1988 | Charquet et al. |
| 4,810,461 A | 3/1989 | Inagaki et al. |
| 4,938,921 A | 7/1990 | Mardon et al. |
| 5,125,253 A | 6/1992 | Gerretz et al. |
| 5,223,206 A | 6/1993 | Rosenbaum |

(Continued)

FOREIGN PATENT DOCUMENTS

WO     00/37214     6/2000

*Primary Examiner* — Emily M. Le
*Assistant Examiner* — Weiping Zhu
(74) *Attorney, Agent, or Firm* — Harness, Dickey & Pierce

(57) ABSTRACT

Disclosed herein are zirconium-based alloys that may be fabricated to form nuclear reactor components, particularly fuel cladding tubes, that exhibit sufficient corrosion resistance and hydrogen absorption characteristics, without requiring a late stage $\alpha+\beta$ or $\beta$-quenching processes. The zirconium-base alloys will include between about 1.30-1.60 wt % tin; 0.0975-0.15 wt % chromium; 0.16-0.24 wt % iron; and up to about 0.08 wt % nickel, with the total content of the iron, chromium and nickel comprising at least about 0.3175 wt % of the alloy. The resulting components will exhibit a surface region having a mean precipitate sizing of between about 50 and 100 nm and a Sigma A of less than about $2\times10^{-19}$ hour with the workpiece processing generally being limited to temperatures below 680° C. for extrusion and below 625° C. for all other operations, thereby simplifying the fabrication of the nuclear reactor components while providing corrosion resistance comparable with conventional alloys.

18 Claims, 4 Drawing Sheets

U.S. PATENT DOCUMENTS

| | | |
|---|---|---|
| 5,437,747 A | 8/1995 | Adamson et al. |
| 5,519,748 A | 5/1996 | Adamson et al. |
| 5,618,356 A | 4/1997 | Adamson et al. |
| 5,620,536 A | 4/1997 | Dahlback |
| 5,681,404 A | 10/1997 | Adamson et al. |
| 5,699,396 A | 12/1997 | Taylor |
| 5,835,550 A | 11/1998 | Van Swam et al. |
| 5,876,524 A | 3/1999 | Andersson |
| 6,125,161 A | 9/2000 | Isobe et al. |
| 6,243,433 B1 | 6/2001 | Adamson et al. |
| 2002/0136347 A1 | 9/2002 | Jeong et al. |

NON-HEAT TREATED ZIRCONIUM ALLOY FUEL CLADDING AND A METHOD OF MANUFACTURING THE SAME

BACKGROUND OF THE INVENTION

1. Field of the Invention

The present invention relates to zirconium alloys, particularly zirconium alloys for use in nuclear reactor fuel cladding applications, and more particularly zirconium alloy fuel cladding manufactured without requiring conventional late stage heat treatments.

2. Background Art

Nuclear reactors are used in electric power generation, research and propulsion. A reactor pressure vessel contains the reactor coolant, i.e., water, which removes heat from the nuclear core. Piping circuits are used to carry the heated water or steam from the pressure vessel to the steam generators or turbines and to return or supply circulated water or feedwater to the pressure vessel. Typical operating pressures and temperatures for the reactor pressure vessels can be about 7 MPa and 288° C. for BWRs (Boiling Water Reactors) and about 15 MPa and 320° C. for PWRs (Pressurized Water Reactors). The materials used in these respective environments must, in turn, be formulated and/or manufactured to withstand various loading, environmental (high-temperature water, oxidizing species, radicals, etc.) and radiation conditions to which they will be subjected during extended operation of the reactor.

BWR and PWR typically include nuclear fuel sealed in cladding comprising one or more layers of metal or metal alloys to isolate the nuclear fuel from the moderator/coolant system, i.e., water in PWRs and steam and/or water in BWRs. The cladding includes at least one layer of a zirconium-based alloy containing one or more alloying element and can include a second layer of a zirconium alloy. Cladding may also utilize a composite system having an inner lining of sponge zirconium or dilute zirconium alloy containing minor amounts, less than about 0.5 wt % of iron or other elements, as alloying metals. Typically, the cladding will be configured as a tube in which pellets of the nuclear fuel are stacked to fill substantially the entire length of the cladding tube. The tubes will then be arranged in bundles, with a plurality of bundles being arranged to define the reactor core.

Under normal operating conditions, zirconium-based alloys are useful as a nuclear fuel cladding material due to their relatively low neutron absorption cross sections and, at temperatures below about 398° C., their strength, ductility, stability, and lack of reactivity in the presence of demineralized water or steam. "Zircaloys" are a widely used family of commercially-available, corrosion-resistant, zirconium-based alloy cladding materials that include 97-99% by weight zirconium, with the balance being a mixture of some or all of tin, iron, chromium, nickel, oxygen and lesser amounts of carbon, silicon and other unavoidable impurities. Two particular alloy compositions, specifically Zircaloy-2 and Zircaloy-4, are widely used for manufacturing cladding although Zircaloy-2 is the more commonly utilized composition for BWR applications.

In addition to zirconium, Zircaloy-2 includes about 1.2-1.7 wt % Sn; 0.07-0.20 wt % Fe; 0.05-0.15 wt % Cr, and 0.03-0.08 wt % Ni. Zircaloy-4, on the other hand, although including similar quantities of the other alloying elements present in Zircaloy-2, is substantially free of nickel and has an Fe concentration of about 0.18-0.24 wt %.

Tin is useful for improving strength and corrosion resistance of zirconium-base alloys. Zirconium alloys containing less than 0.5 wt. % tin do not tend to provide sufficient strength, while alloys containing more than 2 wt. % tin tend to exhibit decreased corrosion resistance. Nickel is useful for imparting improved corrosion resistance to zirconium alloys. When nickel is incorporated at less than about 0.03 wt. %, the improvement in corrosion resistance is marginal, while alloys containing more than 0.2 wt. % tend to exhibit degraded hydrogen absorption characteristics. Like nickel, chromium is useful for imparting improved corrosion resistance to zirconium alloys. The quantity of chromium incorporated in the alloy affects the relative proportions of $Zr_2(Fe, Ni)$ and $Zr(Fe, Cr)_2$ type precipitates that, in turn, affects the corrosion resistance and hydrogen absorption properties of the alloy. Further, although iron can be used to increase corrosion resistance, alloys including more than about 0.6 wt % iron tend to exhibit degraded working characteristics, particularly ductility, so the utility of iron in this regard is limited.

The presence of these alloying elements, which are relatively insoluble in zirconium under normal conditions, will generally result in the formation of intermetallic Second Phase Particle (SPP) "precipitates" in an α-phase zirconium matrix when alloying elements are present in concentrations above their solubility limits. For example, the precipitates most commonly found in Zircaloys may be generally represented by the chemical formulas $Zr(Fe,Cr)_2$ and $Zr_2(Fe,Ni)$.

Coolant, typically demineralized water that may include a variety of treatment compositions or packages, will generally flow through flow channels provided between and/or along the fuel elements to remove heat from the core. The cladding, by separating the nuclear fuel from the coolant, prevents or reduces the amount of radioactive fuel and fission products from entering the coolant stream and being spread throughout the primary cooling system. Degradation of the integrity of the cladding layer, whether by cracking and/or corrosion, may result in containment failures that allow contamination of the coolant.

In addition to the basic composition of the alloy, conventional techniques for fabricating fuel cladding include solution heat treatment methods in which an alloy is heated, for a short period of time, to a temperature at which the alloy exists in α+β or β phase and the intermetallic particles become dissolved, after which the alloy is rapidly quenched, at which point the intermetallic particles can be re-nucleated and grown. Such a process is described in Japanese Patent Publications Nos. 45699/1986, 58223/1988 and 3172731/2001. Other heat treatment methods have been described in U.S. Pat. Nos. 4,450,016, 4,576,654, and 5,437,747, each of which is incorporated by reference herein in its entirety. These patents have focused on the control of process parameters, specifically, the heat treatment conditions with the primary intent of controlling the corrosion resistance through microstructural factors. The major deficiency of these patents is in not recognizing the importance of restrictive alloy chemistry control. Furthermore, in the case of 3172731/2001, the emphasis is on controlling the post-solution heat treat thermal exposure through the use of the "Sigma-A" or "$\Sigma_A$" parameter, which is a measure of the cumulative thermal exposure during fabrication as defined by the formula (I):

$$A = \Sigma t_i \exp(Q/RT_i) \quad (I)$$

where $t_i$ and $T_i$ are the time and temperature of the $i^{th}$ thermal exposure (where t is time in hours; T is temperature in K; Q is the activation energy; R is the gas constant; and Q/R=40,000 K).

However, the use of this parameter solely to control SPP size may not be effective, as differences in process parameters, such as the solution treatment temperature and quench rate, could affect the SPP size for given Sigma-A value or post-solution heat treatment conditions. The application of heat treatment in connection with a particular alloy composition has been detailed in Japanese Laid-Open Patent Publication No. 228442/1987. In this case, the exceptionally high iron and nickel concentrations allowed contribute to $Zr_2(Fe, Ni)$ SPP sizes between 100 and 500 nm and the formation of an unusual Sn—Ni compound.

While efforts to improve claddings have continued, the performance of claddings, particularly with regard to corrosion and hydrogen pickup as a result of interactions between the cladding, the nuclear fuel, the radiation field and the coolant continues to be a concern and a maintenance issue in BWRs. One type of continuing corrosion problem associated with BWR operation is nodular corrosion wherein localized regions on the alloy surfaces form lenticular corrosion layers. This nodular corrosion initiates relatively quickly upon operation in a BWR and proceeds under and may be exacerbated by the continuing irradiation of the alloy surfaces. Nodular corrosion can generally be controlled, particularly in aggressive water chemistry environments, as disclosed in a separate application bearing application Ser. No. 10/935,157 and filed on even date herewith, by an astute combination of alloy composition control, fabrication parameters leading to an intermetallic particle size less than about 40 nm, and smooth surface finish.

One problem however with conventional fuel cladding formulations using intermetallic particle sizes below about 40 nm is the need to provide a late stage solution heat treatment and rapid quench process to achieve the desired result. Such a process is complicated and it requires special equipment, process steps, process controls and quality inspection tasks. The use of such a process is costly.

To overcome this inefficiency it is desirable to fabricate fuel cladding without a late stage solution heat treatment. This would lead to a relative increase in the mean intermetallic particle size when compared to a fuel cladding fabricated identically except for the late stage heat-treatment. For an exemplary process defined by the current invention, the mean intermetallic particle size would be no less than about 50 nm and no more than about 100 nm, limited in part by particle coarsening (Ostwald ripening) that is inherent in conventional cladding fabrication processes that include hot extrusion and multiple stages of cold reduction and thermal recrystallization annealing.

The increase in the mean intermetallic particle size would in turn increase the fuel cladding susceptibility to nodular corrosion, even in typical non-aggressive water chemistry environments.

To help overcome this negative aspect of increased nodular corrosion susceptibility associated with non-heat treated cladding and the associated increase in intermetallic particle size, the maximum allowable mean intermetallic particle size must be limited. While developing such a Zircaloy-2 fuel cladding, this upper limit was estimated to be about 100 nm. Arising from these developmental activities for such a Zircaloy-2 fuel cladding, the importance of specific alloy compositions in maximizing nodular corrosion resistance was discovered. Although the importance of alloy composition in providing corrosion resistance is generally known to those skilled in the art, the specific thresholds required for non-heat treated fuel cladding were not known explicitly, nor could they be predicted explicitly.

Besides the inefficiency of fabrication processes utilizing late stage heat treatments, another problem for heat treated cladding related to corrosion is the evolution of the intermetallic particles under the effects of the neutron radiation field present in a nuclear reactor. In this environment, neutrons impinge on the intermetallic particles and cause them to dissolve and/or amorphize. With a simplified view, the extent of this process is dependent on the neutron energy, the cumulative neutron flux (fluence), and the initial particle size and structure. Components with a relatively small mean SPP size of about 25 nm may dissolve completely within a fast neutron fluence of $8.5 \times 10^{25}$ $n/m^2$ (E>1 MeV) in a BWR, which is less than half as long as the currently desired lifetime for Zr-alloy components. Inasmuch as the intermetallic particles affect corrosion resistance, their evolution and disappearance can affect the corrosion resistance in a negative manner.

Furthermore, inasmuch as component hydrogen generation and absorption (hydriding) follows directly from the corrosion process, SPP evolution can also affect component hydriding in a negative manner. Although such a negative effect of microstructural evolution on both corrosion and hydriding has been documented in the field, the current Applicants' experience with small-particle fuel cladding corrosion in a BWR has been contrary to the conventional understanding promoted by data collected and widely disseminated by F. Garzarolli and others of particular influence in the field as reflected in, for example, Garzarolli, F. Schumann, R., and Steinberg, E., "Corrosion Optimized Zircaloy for Boiling Water Reactor (BWR) Fuel Elements," Zirconium in the Nuclear Industry: Tenth International Symposium, ASTM STP 1245, A. M. Garde and E. R. Bradley, Eds., American Society for Testing and Materials, Philadelphia, 1994, pp. 709-23, the contents of which are hereby incorporated by reference in their entirety.

Because heat treated cladding would tend to have smaller particle sizes than non-heat treated fuel cladding, heat treated fuel cladding would experience relatively quicker particle dissolution than non-heat treated fuel cladding. Thus non-heat treated fuel cladding of this invention, although being generally more susceptible to nodular corrosion, may have some benefit in delaying microstructural evolution-induced changes in corrosion resistance and hydriding that may occur at the later exposure stages in a component's operational life.

SUMMARY OF THE INVENTION

The present invention relates to zirconium alloys suitable for use in nuclear reactors, particularly BWR, and a method for producing claddings and other reactor components comprising such zirconium alloys, that exhibit high corrosion resistance and low hydrogen pickup in a nuclear reactor in non-aggressive coolant conditions, said cladding and components being manufactured without a post-extrusion late stage $\alpha+\beta$ or $\beta$ heat treatment. The use of a controlled composition Zircaloy-2 or Zircaloy-4 ingot, an initial $\beta$-quench, restricted thermal exposure subsequent to the $\beta$-quench and a smooth final surface provide a component that does not require the conventional late-stage $\alpha+\beta$ or $\beta$ heat treatment but still provides a level of corrosion resistance and hydrogen pickup suitable for use in high burn-up nuclear reactor applications.

An exemplary process for manufacturing a reactor component in accord with the present invention, will include the formation of a Zircaloy-2 alloy ingot having a combination of alloying metals that fall within the composition range provided for exemplary alloys. The zirconium and the appropriate quantity of the selected alloying metals are then melted together to form an alloy ingot, typically using a multiple melt process for improving the compositional uniformity throughout the ingot. The ingot may then be formed into a generally cylindrical hollow billet when fabricating cladding tubes, by hot forging, machining or a combination of processes. Alternatively, for fabrication of flat or sheet components, the ingot may be formed into a slab shape, with the slab thickness comparable with the wall thickness of the cylindrical billet used for tubular components. Preferred Zircaloy-2 compositions for use in the billet will include a Sn concentration of between about 1.30-1.60 wt %, a Cr concentration of about 0.0975-0.15 wt %, a Fe concentration of about 0.16-0.20 wt %, and a Ni concentration of about 0.06-0.08 wt %, with the total content of the Fe, Cr and Ni being above about 0.3175 wt %.

The hollow billet or solid slab, which may be generically referred to as a workpiece, will then be subjected to a β-quench process, followed by additional fabrication processes and heat treatments to form cladding tubes or sheet products. For example, following the β-quench process, a hollow billet may be extruded and then subjected to multiple stages of hot and cold reduction and annealing to reduce the extruded billet to near-final cladding wall thickness and diameter. Similarly, a β-quenched slab may be subjected to multiple stages of hot and cold reduction and annealing to reduce the slab to near-final thickness.

Tubes may receive multiple cold-reduction and annealing cycles following the billet extrusion, but a 4-stage cold-reduction schedule is preferred. Slab workpieces may typically receive a minimum of 3 hot or cold reduction cycles following the beta-quench. Following each reduction stage, an annealing treatment will be conducted. The annealing treatments will be limited to less than about 625° C. and their duration, although sufficient to induce stress relief or recrystallization, will be short enough so as not to promote significant Ostwald ripening, thereby maintaining a distribution of moderately sized SPPs, e.g., having a mean diameter of between about 50 and 100 nm, and, preferably, less than about 80 nm. The mean diameter and spacing of precipitates within an alloy composition may be easily determined using transmission electron microscopy (TEM) techniques known to those of ordinary skill in the art. Sigma A will be less than $2 \times 10^{-19}$ hour.

Exemplary embodiments of cladding tubes according to the invention will also exhibit a very smooth surface, e.g., a surface roughness of less than about 0.5 μm Ra, preferably a surface roughness of less than about 0.25 μm Ra, more preferably a surface roughness of less than about 0.15 μm Ra, and most preferably a surface roughness of less than about 0.10 μm Ra. It is believed that the reduced surface roughness will render such cladding less likely to form scale deposits that can contain or trap impurities from the coolant that can harm the cladding and thus accelerate corrosion. This additional protection against corrosion is essential to counteract the decrease in nodular corrosion resistance caused by electing not to include a late stage heat treatment in the fabrication process. Cladding tubes fabricated according to the exemplary embodiments of the invention may also include additional inner liner or barrier layers of zirconium or other zirconium alloy compositions. In particular zirconium alloys microalloyed with Fe at levels between about 0.085 and 0.2 wt % are useful as liner layers.

BRIEF DESCRIPTION OF THE DRAWINGS

The above and other aspects and advantages of the present invention will become more apparent in the following detailed descriptions of exemplary embodiments thereof with reference to the attached drawings in which.

DETAILED DESCRIPTION OF EXEMPLARY EMBODIMENTS

Figure 1:
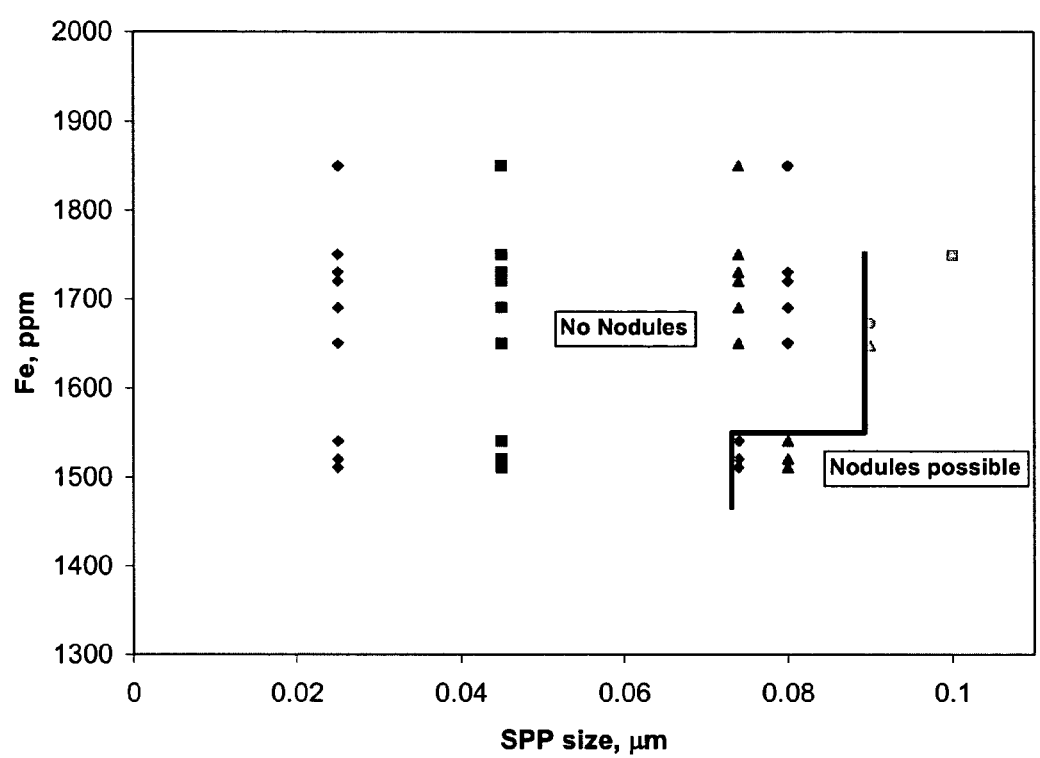
FIG. 1 is a graph illustrating a relationship between SPP size and Fe content on the resulting nodular corrosion.
Figure 2:
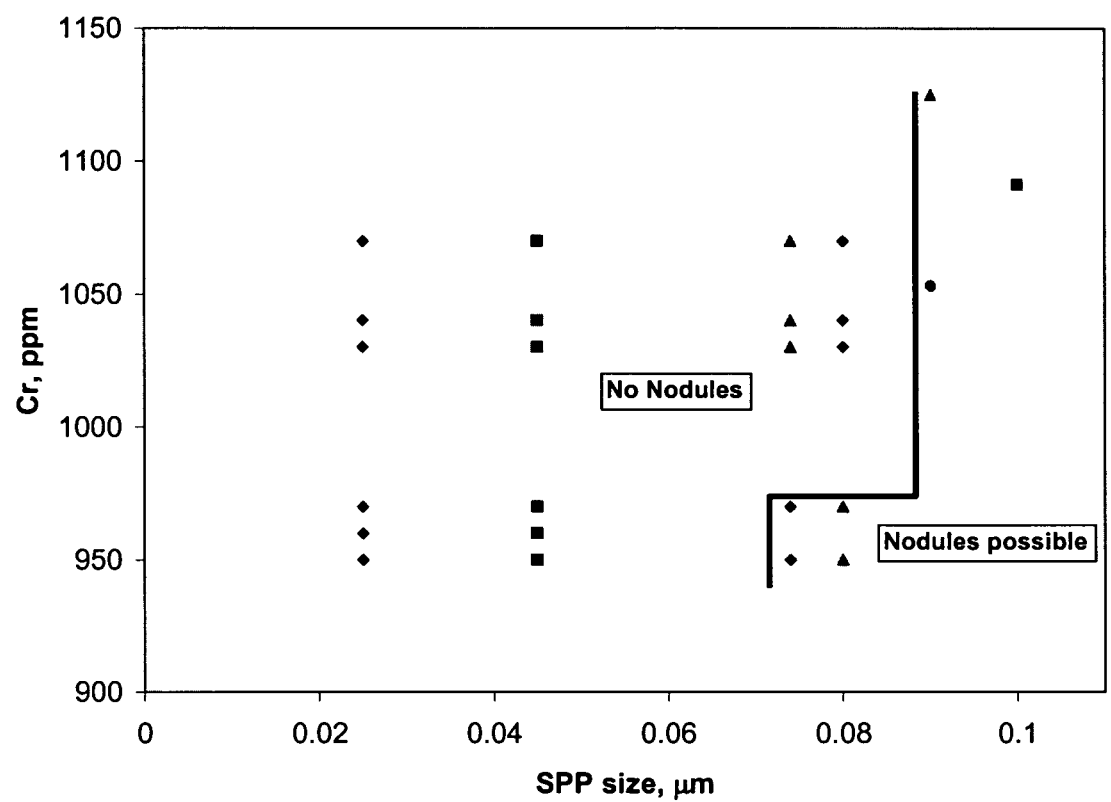
FIG. 2 is a graph illustrating a relationship between SPP size and Cr content on the resulting nodular corrosion.
Figure 3:
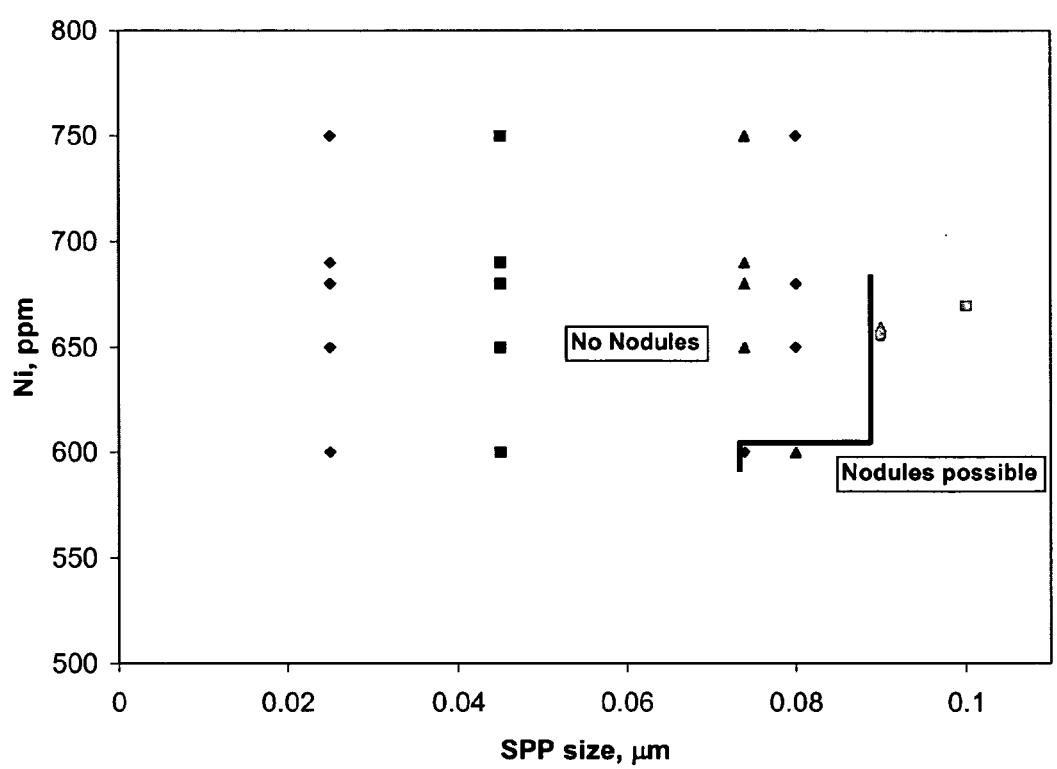
FIG. 3 is a graph illustrating a relationship between SPP size and Ni content on the resulting nodular corrosion.
Figure 4:
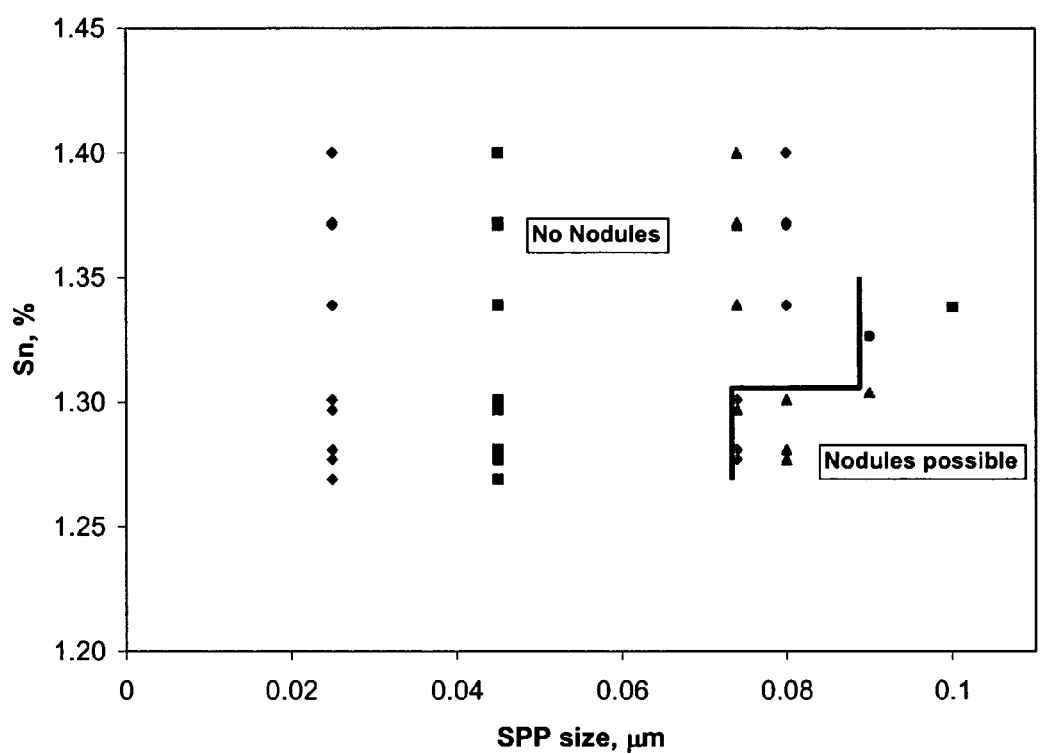
FIG. 4 is a graph illustrating a relationship between SPP size and Sn content on the resulting nodular corrosion.

Developmental testing of non-heat treated fuel cladding materials led to the discovery of specific alloy concentration ranges, in particular, the lower limits, of iron, chromium, nickel, the summation of Fe+Cr+Ni, and tin that provide improved nodular corrosion resistance of non-heat treated cladding. The improved nodular corrosion resistance is comparable with that of conventional Zircaloy compositions and SPP size resulting from late-stage heat treatment. As shown in FIGS. 1-4 which illustrate nodular corrosion susceptibility using a two-step steam test as disclosed in U.S. Pat. No. 4,440,862, which is incorporated herein in its entirely by reference, there is reduced susceptibility of non-heat treated coupons when the iron, chromium, nickel, and tin contents are increased.

When using this two-step steam test, the primary assessment criterion is the number of nodules visible to the naked eye on a test piece of specific size. With a desired result in the two-step steam test of zero nodules, the results in FIGS. 1-4 illustrate the benefit of restricting the alloying composition range to above about 0.16 wt % Fe, above about 0.0975 wt % Cr, above about 0.06 wt % Ni, above about 0.3175 wt % Fe+Cr+Ni, and above about 1.30 wt % Sn when the SPP size is about 80 nm resulting from fabrication processes according to exemplary embodiments of this invention. When the SPP size is near 100 nm, even greater restrictions on alloying concentrations are necessary to achieve the improved nodular corrosion resistance rating (i.e., zero nodules).

The preferred composition Zircaloy-2 alloys according to the present invention include tin at a level between about 1.30 and about 1.60 wt %, chromium at about 0.0975-0.15 wt %, iron at 0.16-0.20 wt %, nickel at 0.06-0.08 wt %, with the total content of the iron, chromium and nickel being at least about 0.3175 wt %. A Zircaloy-4 may also be used with corresponding tin and chromium levels, but with an iron level of up to about 0.24 wt %.

The mean precipitate size as determined by transmission electron microscopy may be between about 50 and 100 nm near an outer surface region, and preferably between about 50 and 80 nm. The cladding or other nuclear reactor components may then be fabricated from an alloy having the appropriate composition using a hollow billet β quench, which results in a more advantageous SPP size than a solid billet beta quench, or a slab β quenched with a wall thickness comparable with a hollow billet, while avoiding any post-β quench solution heat treatment, e.g., heating the material to temperatures in the α+β or β phase ranges. More specifically, the cladding material is fabricated using a process that limits post-billet β-quench processes to temperatures of less than about 680° C. and provides a surface roughness of less than about 0.25 μm Ra and preferably less than about 0.1 μm Ra. Cladding materials having a composition within the exemplary ranges and processed according to the exemplary method tend to exhibit corrosion characteristics similar to those of conventional materials having mean precipitate sizes of less than about 40 nm in typical non-aggressive water chemistry environments.

An exemplary zirconium alloy according to the present invention can be produced from an ingot melt that is subjected to hot forging between 700 and 950° C.), a solution treatment (e.g., at approximately 1000° C. for several minutes) and then formed into a billet suitable for extrusion or a slab for further reduction operations. Double billets may also be prepared by combining two alloys having different chemical compositions. The billet may then be subjected to hot extrusion at 600 to 680° C. to obtain a hollow tubeshell. In general, this tubeshell is then subjected to cold rolling and additional treatments to obtain a fuel cladding tube, but without being subjected to the conventional α+β or β-quenching-processing in conjunction with the cold rolling step(s). Similarly, a β-quenched slab is subjected to hot or cold rolling and additional treatments, and likewise without being subjected to the conventional α+β or β-quenching processing in conjunction with the cold rolling step(s). The above-described zirconium-based alloys according to the present invention are excellent in both corrosion resistance and hydrogen absorption characteristics and are useful, for example, for the fabrication of a variety of nuclear reactor components, including fuel cladding tubes in fuel assemblies, spacer bands, spacer cells and water rods.

We claim:

1. A method for manufacturing a nuclear reactor component comprising:
   preparing a zirconium-base alloy including
      a tin content of between about 1.30 and 1.60 wt %;
      a chromium content of between about 0.0975 and 0.15 wt %;
      an iron content of between about 0.16 and 0.24 wt %; and
      a nickel content of between 0.0 and about 0.08 wt %;
   wherein a total content of the iron, chromium and nickel included in the zirconium-base alloy is at least about 0.3175 wt %; a balance being zirconium, oxygen, lesser amounts of carbon and silicon, and unavoidable impurities;
   forming a workpiece from the zirconium-base alloy;
   performing a β-quench on the workpiece to form a quenched workpiece;
   performing additional forming processes to complete the nuclear reactor component from the quenched workpiece, wherein the additional forming processes may be selected from the group consisting of an extrusion process conducted at an extrusion temperature of less than about 680° C., cold deformations and hot deformations;
   wherein the workpiece is not subjected to a temperature greater than about 625° C. subsequent to the extrusion process and all the additional forming processes result in a final workpiece Sigma-A value of less than $2 \times 10^{-19}$ hour;
   wherein the nuclear reactor component includes a surface region having secondary phase precipitates (SPP), the secondary phase precipitates having a mean diameter no less than about 50 nm and no greater than about 100 nm; and
   further wherein the nuclear reactor component includes a wetted surface having a surface roughness no greater than about 0.50 μm Ra.

2. A method for manufacturing a nuclear reactor component according to claim 1, wherein:
   the zirconium-base alloy is Zircaloy-2;
   the nickel content is between about 0.06 and 0.08 wt %; and
   the iron content is between about 0.165 and 0.20 wt %.

3. A method for manufacturing a nuclear reactor component according to claim 1, wherein:
   the zirconium-base alloy is Zircaloy-2;
   the nickel content is between about 0.06 and 0.08 wt %; and
   the iron content is between about 0.17 and 0.20 wt %.

4. A method for manufacturing a nuclear reactor component according to claim 1, wherein:
   the zirconium-base alloy is Zircaloy-2;
   the nickel content is between about 0.06 and 0.08 wt %; and
   the iron content is between about 0.18 and 0.20 wt %.

5. A method for manufacturing a nuclear reactor component according to claim 1, wherein:
   the iron content is between about 0.20 and 0.22 wt %.

6. A method for manufacturing a nuclear reactor component according to claim 1, wherein:
   the iron content is between about 0.20 and 0.24 wt %.

7. A method for manufacturing a nuclear reactor component according to claim 1, wherein:
   the iron content is between about 0.18 and 0.22 wt %.

8. A method for manufacturing a nuclear reactor component according to claim 1, wherein:
   the zirconium-base alloy is Zircaloy-4;
   the nickel content is approximately 0.0 wt %; and
   the iron content is between about 0.18 and 0.24 wt %.

9. A method for manufacturing a nuclear reactor component according to claim 1, wherein:
   the secondary phase precipitates have a mean diameter no less than about 50 nm and no greater than about 80 nm.

10. A method for manufacturing a nuclear reactor component according to claim 1, wherein:
    the wetted surface has a surface roughness no greater than about 0.25 μm Ra.

11. A method for manufacturing a nuclear reactor component according to claim 1, wherein:
    the wetted surface has a surface roughness no greater than about 0.10 μm Ra.

12. A method for manufacturing a nuclear reactor component according to claim 1, wherein:
    the workpiece is a hollow billet having a wall thickness of less than about 10 mm; and
    the β-quench includes
       maintaining the hollow billet at a temperature within a β-phase range for a treatment duration sufficient to cause microstructural homogenization to form a treated hollow billet and
    cooling a surface region of the treated hollow billet at a quenching rate of at least 25° C./second to a temperature below 500° C. to form a quenched billet.

13. A method for manufacturing a nuclear reactor component according to claim 1, wherein:
    forming the nuclear reactor component from the quenched workpiece includes one or more operations selected from the group consisting of extrusion, coextrusion, hot rolling, cold rolling, milling, polishing, pickling, cleaning, pilgering and stress relief or recrystallization annealing.

14. A method for manufacturing a nuclear reactor component according to claim 1, wherein the workpiece is a first hollow billet, further comprising:
    forming a second hollow billet, the second hollow billet including zirconium;
    combining the quenched workpiece and the second hollow billet to form a composite hollow billet, whereby an interior surface of the second hollow billet forms an interior surface of the composite hollow billet; and
    forming the nuclear reactor component from the composite hollow billet.

15. A method for manufacturing a nuclear reactor component according to claim 14, wherein:
    the second hollow billet consists essentially of zirconium.

16. A method for manufacturing a nuclear reactor component according to claim 14, wherein:

the second hollow billet includes zirconium microalloyed with between about 0.085 and about 0.20 wt % iron.

17. A method for manufacturing a nuclear reactor component according to claim 1, wherein:

the workpiece is a slab and the additional forming processes do not include an extrusion process.

18. A method for manufacturing a nuclear reactor component according to claim 1, wherein:

the nuclear reactor component is selected from the group consisting of a fuel cladding tube, a spacer band, a spacer cell and a water rod.

* * * * *